United States Patent
Jang et al.

(10) Patent No.: US 11,037,283 B2
(45) Date of Patent: Jun. 15, 2021

(54) INSPECTING APPARATUS BASED ON HYPERSPECTRAL IMAGING

(71) Applicant: Samsung Electronics Co., Ltd., Suwon-si (KR)

(72) Inventors: Sung-Ho Jang, Hwaseong-si (KR); Yasuhiro Hidaka, Yokohama (JP); Young-kyu Park, Incheon (KR); Ye-eun Park, Hwaseong-si (KR); Yu-Sin Yang, Seoul (KR)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 66 days.

(21) Appl. No.: 16/444,719

(22) Filed: Jun. 18, 2019

(65) Prior Publication Data
US 2020/0184624 A1 Jun. 11, 2020

(30) Foreign Application Priority Data
Dec. 11, 2018 (KR) .......................... 10-2018-0159423

(51) Int. Cl.
| | | |
|---|---|---|
| G06T 7/00 | (2017.01) | |
| G02B 27/09 | (2006.01) | |
| G02B 5/30 | (2006.01) | |
| H04N 13/239 | (2018.01) | |
| G02B 26/12 | (2006.01) | |

(52) U.S. Cl.
CPC .............. *G06T 7/0002* (2013.01); *G02B 5/30* (2013.01); *G02B 26/12* (2013.01); *G02B 27/0977* (2013.01); *H04N 13/239* (2018.05)

(58) Field of Classification Search
CPC ...... G06T 7/0002; H04N 13/239; G02B 5/30; G02B 26/12; G02B 27/0977
See application file for complete search history.

(56) References Cited

U.S. PATENT DOCUMENTS

| 5,486,919 | A | 1/1996 | Tsuji et al. |
| 6,621,571 | B1 | 9/2003 | Maeda et al. |
| 7,080,912 | B2 | 7/2006 | Cook |
| 7,411,682 | B2 | 8/2008 | Moshe |

(Continued)

FOREIGN PATENT DOCUMENTS

| JP | 3126546 B2 | 1/2001 |
| JP | 2003097924 A * | 4/2003 |

(Continued)

*Primary Examiner* — Khai M Nguyen
(74) *Attorney, Agent, or Firm* — Muir Patent Law, PLLC (57) ABSTRACT

Provided is a hyperspectral imaging (HSI)-based inspection apparatus capable of quickly and stably performing two-dimensional (2D) HSI for an inspection object, and accordingly, capable of quickly and accurately inspecting the inspection object. The HSI-based inspection apparatus includes: a stage on which an inspection object is arranged; an optical system configured to allow light to be incident on the inspection object and emit the light reflected from the inspection object; a scan mirror configured to reflect the emitted light from the optical system while rotating; and a hyperspectral camera configured to obtain an image having a wavelength direction and a line direction as two axes for light reflected from the scan mirror, wherein, by using the rotation of the scan mirror, the hyperspectral camera is configured to perform the 2D HSI for the inspection object.

17 Claims, 10 Drawing Sheets

(56) References Cited

U.S. PATENT DOCUMENTS

| | | | |
|---|---|---|---|
| 7,561,265 B2* | 7/2009 | Kobayashi | G01J 3/02 |
| | | | 356/318 |
| 7,697,137 B2 | 4/2010 | Comstock et al. | |
| 7,756,311 B2 | 7/2010 | Yasuno et al. | |
| 8,594,770 B2 | 11/2013 | Wood et al. | |
| 9,200,958 B2* | 12/2015 | Comstock | H04N 9/04 |
| 10,022,818 B2 | 7/2018 | Webster et al. | |
| 2007/0121106 A1* | 5/2007 | Shibata | G06T 7/001 |
| | | | 356/237.2 |
| 2008/0225299 A1* | 9/2008 | Ono | G02B 26/12 |
| | | | 356/447 |
| 2014/0115022 A1 | 4/2014 | Yasuno et al. | |
| 2015/0283586 A1* | 10/2015 | Dante | G06K 9/0063 |
| | | | 209/577 |

FOREIGN PATENT DOCUMENTS

| | | | |
|---|---|---|---|
| JP | 2009109281 A * | 5/2009 | |
| JP | 4887989 B2 | 2/2012 | |
| KR | 101755615 B1 * | 7/2017 | |
| KR | 101917131 B1 * | 1/2019 | |

* cited by examiner

INSPECTING APPARATUS BASED ON HYPERSPECTRAL IMAGING

CROSS-REFERENCE TO RELATED APPLICATION

This application claims the benefit of priority under 35 U.S.C. § 119 to Korean Patent Application No. 10-2018-0159423, filed on Dec. 11, 2018, in the Korean Intellectual Property Office, the disclosure of which is incorporated herein in its entirety by reference.

BACKGROUND

The inventive concept relates to an inspection apparatus, and more particularly, to an inspecting apparatus using hyperspectral imaging (HSI) technology.

HSI technology is a technique for obtaining a plurality of spatial images for an object to be inspected by dividing light into wavelengths of a narrow spectrum width. Cameras to which the HSI technology is applied are called hyperspectral cameras. Generally, a hyperspectral camera may obtain images in a line shape according to wavelengths. For example, the hyperspectral camera may obtain an image that corresponds to the wavelength on one axis and to the line on the other axis by using an area imaging sensor mounted therein. In addition, the hyperspectral camera may obtain a two-dimensional (2D) image, according to wavelength, of the inspection object by scanning the inspection object while moving the inspection object in a direction perpendicular to the line. For example, the hyperspectral camera may generate a three-dimensional (3D) hyper-cube image of the inspection object with directions of the wavelength, the line, and scanning as axes. By analyzing the hyper-cube image obtained by using the hyperspectral camera, the state of the inspection object may be inspected.

SUMMARY

The inventive concept provides a hyperspectral imaging (HSI)-based inspection system that is capable of quickly and stably applying a two-dimensional (2D) HSI to an inspection object, and accordingly, is capable of quickly and accurately inspecting the inspection object.

According to an example embodiment, the disclosure is directed to a hyperspectral imaging (HSI)-based inspection apparatus, the apparatus comprising: a stage on which an inspection object is arranged; an optical system configured to allow an input light to be incident on the inspection object and to emit reflected light reflected from the inspection object; a scan mirror configured to rotate and to reflect light emitted from the optical system while rotating; and a hyperspectral camera configured to obtain an image having a wavelength direction and a line direction as two axes for light reflected from the scan mirror, wherein, by using rotation of the scan mirror, the hyperspectral camera is configured to perform a two-dimensional (2D) HSI for a sample area of the inspection object.

According to an example embodiment, the disclosure is directed to a hyperspectral imaging (HSI)-based inspection apparatus, the apparatus comprising: a light source; a stage on which an inspection object is arranged; an illumination optical system configured to input light from the light source to the inspection object; an imaging optical system configured to output light reflected from the inspection object to a scan mirror; the scan mirror configured to rotate and to reflect light output from the imaging optical system while rotating; and a hyperspectral camera configured to obtain an image having a wavelength direction and a line direction as two axes for light reflected from the scan mirror, wherein, by using rotation of the scan mirror, the hyperspectral camera is configured to perform a two-dimensional (2D) HSI for the inspection object.

According to an example embodiment, the disclosure is directed to a hyperspectral imaging (HSI)-based inspection apparatus, the apparatus comprising: an optical system configured to allow input light to be incident on an inspection object and to emit light reflected from the inspection object; a scan mirror configured to rotate and to reflect light emitted from the optical system while rotating; and a hyperspectral camera configured to obtain an image having a wavelength direction and a line direction as two axes for light reflected from the scan mirror.

BRIEF DESCRIPTION OF THE DRAWINGS

Embodiments of the inventive concept will be more clearly understood from the following detailed description taken in conjunction with the accompanying drawings in which.

DETAILED DESCRIPTION OF THE EMBODIMENTS

Hereinafter, embodiments of the present inventive concept will be described in detail with reference to the accompanying drawings. Identical reference numerals are used for the same constituent elements in the drawings, and duplicate descriptions thereof are omitted.

Figure 1:
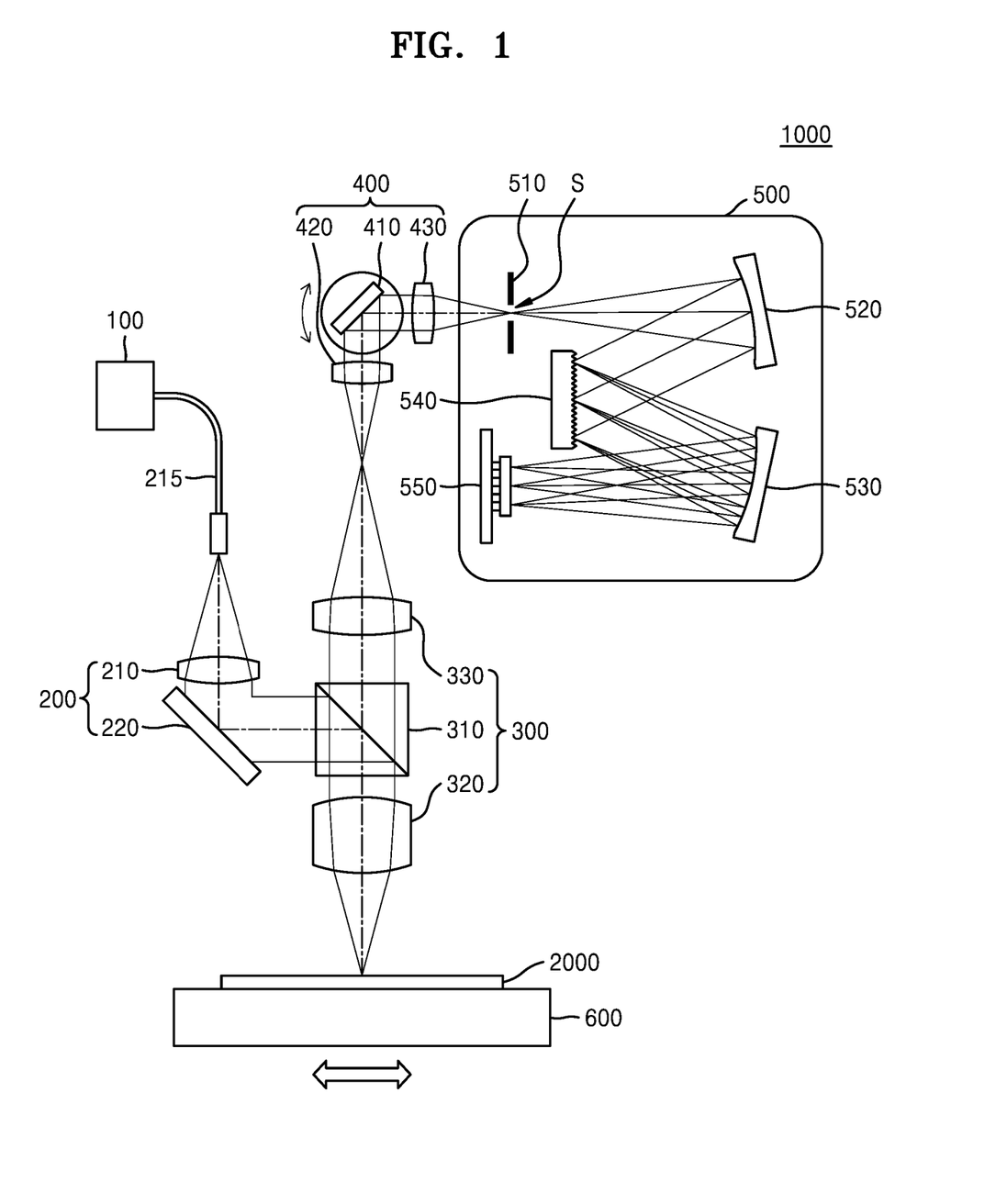
FIG. 1 is a schematic diagram illustrating a hyperspectral imaging (HSI)-based inspection apparatus, according to an example embodiment.

FIG. 1 is a schematic diagram illustrating a hyperspectral imaging (HSI)-based inspection apparatus 1000 according to an example embodiment.

Referring to FIG. 1, the HSI-based inspection apparatus 1000 according to the example embodiment may include a light source 100, an illumination optical system 200, an imaging optical system 300, a scan mirror unit 400, a hyperspectral camera 500, and a stage 600.

The light source 100 may be a broadband light source that generates and outputs broadband light. The broadband light of the light source 100 may be multi-colored light including light of a plurality of wavelength bands. For example, in the HSI-based inspection apparatus 1000 of the embodiment, the light source 100 may generate and output light having a band of about 170 to about 2100 nm. However, the band of light generated by the light source 100 is not limited thereto. The light source 100 may include a halogen lamp light source or a light emitting diode (LED) light source that generates continuous spectrum light. However, a type of the light source 100 is not limited thereto. By implementing the light source 100 as a broadband light source, a variety of spectrum configurations may be possible.

The illumination optical system 200 may include a condensing lens 210 and a mirror 220. The illumination optical system 200 may irradiate light from the light source 100 to an inspection object 2000 on the stage 600 through the condensing lens 210 and the mirror 220. Light from the light source 100 may be transmitted to the illumination optical system 200 through an optical fiber 215. According to the embodiment, the illumination optical system 200 may further include a collimator for converting light into parallel light.

The imaging optical system 300 may include a beam splitter 310, an object lens 320, and a tube lens 330. The beam splitter 310 may allow light to be incident on the inspection object 2000 and output reflected light reflected from the inspection object 2000 toward the scan mirror unit 400. For example, the beam splitter 310 may transmit or reflect the incident light from the illumination optical system 200 to be incident on the inspection object 2000, and reflect or transmit the reflected light reflected from the inspection object 2000 and output the reflected or transmitted light toward the scan mirror unit 400.

The object lens 320 may condense the light from the beam splitter 310 into the inspection object 2000 to be incident thereon. For example, the object lens 320 may be arranged so that a focus of light is formed on a surface of the inspection object 2000 to be inspected. In addition, the object lens 320 may allow the reflected light beam reflected from the inspection object 2000 to be incident on the beam splitter 310. For example, the object lens 320 may convert the reflected light from the inspection object 2000 into parallel light, and allow the converted light to be incident on the beam splitter 310.

The tube lens 330 may condense light from the beam splitter 310 and allow the condensed light to be incident on a first relay lens 420 of the scan mirror unit 400. The tube lens 330 may be between the beam splitter 310 and the first relay lens 420 and may function as an imaging lens by condensing the light from the beam splitter 310 at a certain position. Accordingly, the tube lens 330 may be referred to as the imaging lens. According to the embodiment, at least one mirror may be between the beam splitter 310 and the tube lens 330. A path of light may be changed by additionally arranging a mirror, and accordingly, the overall size of the HSI-based inspection apparatus 1000 may be reduced, or the degree of freedom of an arrangement position of the scan mirror unit 400 may be increased.

For reference, an optical system in an optical inspection apparatus may be divided into an illumination optical system and an imaging optical system. In general, the illumination optical system may refer to an optical system on a path from the light source 100 to the inspection object 2000, and the imaging optical system may refer to an optical system on a path from the inspection object 2000 to a detector, for example, the hyperspectral camera 500. In the HSI-based inspection apparatus 1000 of the example embodiment, the scan mirror unit 400 may be at a front end of the hyperspectral camera 500, and thus, the imaging optical system 300 may be defined as an optical system on a path from the inspection object 2000 to the scan mirror unit 400.

The scan mirror unit 400 may include a Galvano mirror 410, the first relay lens 420, and a second relay lens 430. The Galvano mirror 410 may be referred to as a Galvo-mirror and may rotate with an angle thereof linearly changing with respect to a change of an input drive voltage. For example, an angle of the Galvano mirror 410 may change in linear response to a change of an input drive signal. The first relay lens 420 may convert the light from the tube lens 330 into parallel light and allow the converted light to be incident on the Galvano mirror 410. The second relay lens 430 may condense light reflected from the Galvano mirror 410 on a portion of a slit plate 510 of the hyperspectral camera 500.

The scan mirror unit 400 may change a position of the reflected light through a rotation of the Galvano mirror 410, and accordingly, a sample area of the inspection object 2000 (e.g., sample area SA in FIG. 2) may be scanned in one direction and the HSI may be performed in an image sensor 550. Based on a scan function of the Galvano mirror 410, the Galvano mirror 410 may be referred to as a scan mirror. The function of the scan mirror unit 400 is described in more detail with reference to FIGS. 2A through 5.

A hyperspectral camera 500 may include the slit plate 510, a first concave mirror 520, a second concave mirror 530, a spectroscopic element 540, and an image sensor 550. In some example embodiments, the hyperspectral camera 500 may include only the first concave mirror 520, the second concave mirror 530, the spectroscopic element 540, and the image sensor 550, and the slit plate 510 may be a component separate from the hyperspectral camera 500. As discussed more fully below, the hyperspectral camera 500 may obtain an image having a wavelength direction and a line direction as two axes for light reflected from the scan mirror unit 400.

The slit plate 510 may include a slit S of a line shape. The light from the scan mirror unit 400 may be changed into light of a line shape after passing through the slit S of the slit plate 510. According to an example embodiment, the slit plate 510 may include a plurality of slits S.

The first concave mirror 520 may reflect light of a line shape from the slit plate 510 and allow the reflected light to be incident on the spectroscopic element 540.

The spectroscopic element 540 may disperse the light incident from the first concave mirror 520 according to wavelength. The spectroscopic element 540 may be implemented as, for example, a grating or a prism. When the spectroscopic element 540 is implemented as a grating, the spectroscopic element 540 may disperse the incident light through a diffraction phenomenon according to wavelength. In the HSI-based inspection apparatus 1000 of the embodiment, the spectroscopic element 540 may be implemented as a grating.

The second concave mirror 530 may reflect the dispersed light by the spectroscopic element 540 and may allow the reflected light to be incident on the image sensor 550.

As described above, the image sensor 550, as an area imaging sensor, may obtain an image having one axis corresponding to a wavelength and another axis corresponding to a line, that is, the HSI. For example, one narrow spatial line of the sample area SA may be imaged at a time, and this line may be split into its spatial components before reaching the sensor array. On the image sensor 550, the first dimension may correspond to spectral separation and the second dimension may correspond to imaging in one spatial direction. In addition, by a rotation of the Galvano mirror 410 of the scan mirror unit 400, the image sensor 550 may perform a two-dimensional (2D) HSI for the sample area (e.g., sample area SA in FIG. 2). For example, in the HSI-based inspection apparatus 1000 of an embodiment, by the rotation of the Galvano mirror 410 of the scan mirror unit 400, the sample area SA of the inspection object 2000 may be scanned in a direction perpendicular to the line, and the HSI may be performed in the image sensor 550, and accordingly, the hyperspectral camera 500 may generate a three-dimensional (3D) hyper-cube image for the sample area SA of the inspection object 2000. Here, the 3D hyper-cube image may correspond to a 3D image having the wavelength direction, the line direction, and the scan direction as axes for the sample area SA of the inspection object 2000. As the 3D hyper-cube image is analyzed by an analyzing apparatus, a state of the inspection object 2000 may be measured/inspected. Here, the state of the inspection object 2000 may be, for example, a thickness, a pattern shape, or a critical dimension (CD) of a thin layer on the inspection object 2000. However, the state of the inspection object 2000 is not limited thereto.

The HSI-based inspection apparatus 1000 of the embodiment may further include an analysis apparatus, although not illustrated. The analysis apparatus may measure/inspect the state of the inspection object 2000 by analyzing the image of the HSI or the 3D hyper-cube image by using an analysis program. The analyzing apparatus may be implemented by a general personal computer (PC), a workstation, a super computer, etc. including a processor, a storage medium, etc. which are capable of executing an analysis program. For example, the analysis apparatus can include one or more of the following components: at least one central processing unit (CPU) configured to execute computer program instructions to perform various processes and methods, random access memory (RAM) and read only memory (ROM) configured to access and store data and information and computer program instructions, input/output (I/O) devices configured to provide input and/or output to the analysis apparatus (e.g., keyboard, mouse, display, speakers, printers, modems, network cards, etc.), and storage media or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, any type of tangible and non-transitory storage medium) where data and/or instructions can be stored. In addition, the analysis apparatus can include antennas, network interfaces that provide wireless and/or wire line digital and/or analog interface to one or more networks over one or more network connections (not shown), a power source that provides an appropriate alternating current (AC) or direct current (DC) to power one or more components of the analysis apparatus, and a bus that allows communication among the various disclosed components of the analysis apparatus.

In the HSI-based inspection apparatus 1000 of the embodiment, a method of measuring/inspecting the state of the inspection object 2000, in which the 2D HSI image or the 3D hyper-cube image for the sample area SA of the inspection object 2000 obtained by using the hyperspectral camera 500 is analyzed, may be as follows. For example, when the thickness of the thin layer on the inspection object 2000 is inspected, the image of the HSI or the image of the 3D hyper-cube may vary depending on the thickness of the thin layer. For example, the optical intensities of the images acquired for each wavelength may vary depending on the thickness of the thin film. Here, the optical intensity of the image may be related to, for example, the reflectance and/or spectral efficiency of the light in the sample area SA of the inspection object 2000, and the reflectance and/or spectral efficiency may be related to the thickness of the thin layer on the sample area SA. Accordingly, the data on the optical intensities of the 3D hyper-cube image may be quantified and stored in a database according to the thickness of the thin layer, and utilized as reference data. As a result, after the 3D hyper-cube image for the sample area SA of the inspection object 2000 is obtained through the HSI-based inspection apparatus 1000 of the embodiment, by comparing data for the obtained 3D hyper-cube image with reference data for the 3D hyper-cube image stored in the database, the thickness of the thin layer on the inspection object 2000 may be measured/inspected.

The thin layer on the inspection object 2000 may be a single layer or a multi-layer including a plurality of layers. In addition, when the thin layer on the inspection object 2000 is a multi-layer, the data for the 3D hyper-cube image according to a thickness of each layer may be quantified and stored in the database, and accordingly, by obtaining the 3D hyper-cube image for the multi-layer by using the HSI-based inspection apparatus 1000 according to the embodiment, the thickness of each layer of the multi-layer may be measured/inspected. Although the thickness of the thin film has been described as an example, the pattern shape or the CD of the thin layer may be measured/inspected by using the same method.

The stage 600, as an apparatus on which the inspection object 2000 is arranged and supported, may move the inspection object 2000 in a linear movement and a rotational movement. For example, the stage 600 may be implemented as an R-θ stage or an x-y-z stage. For reference, the R-θ stage may move the inspection object 2000 through a linear movement and rotational movement, and the x-y-z stage may move the inspection object 2000 only through the linear movement. The stage 600 may have a size large enough to support a wafer, and it may include an outer confinement ring having a size to secure a wafer in place during processing.

For reference, the inspection object 2000 may refer to various elements to be inspected such as a wafer, a semiconductor package, a semiconductor chip, and a display panel. For example, in the HSI-based inspection apparatus 1000 of the embodiment, the inspection object 2000 may be a wafer, such as a semiconductor wafer. Here, the wafer may be a wafer on which at least one layer of a thin layer is formed on the substrate, and a periodic pattern such as line-and-space (L/S) or an aperiodic pattern may be formed on the thin layer. In addition, in some embodiments, a pattern may not be formed on the thin layer.

By including the scan mirror unit 400 capable of scanning the sample area SA of the inspection object 2000 in one direction, the HSI-based inspection apparatus 1000 according to an embodiment may promptly and accurately perform the 2D HSI for the sample areas SA of the inspection object 20000 in the hyperspectral camera 500, through the rotation of the Galvano mirror 410 and the movement of the stage 600. In addition, since the 2D HSI for the sample areas SA of the inspection object 2000, that is, the 3D hyper-cube image for the sample areas SA of the inspection object 2000 is analyzed, the state of the inspection object 2000 may be performed accurately and promptly.

Figure 2A:
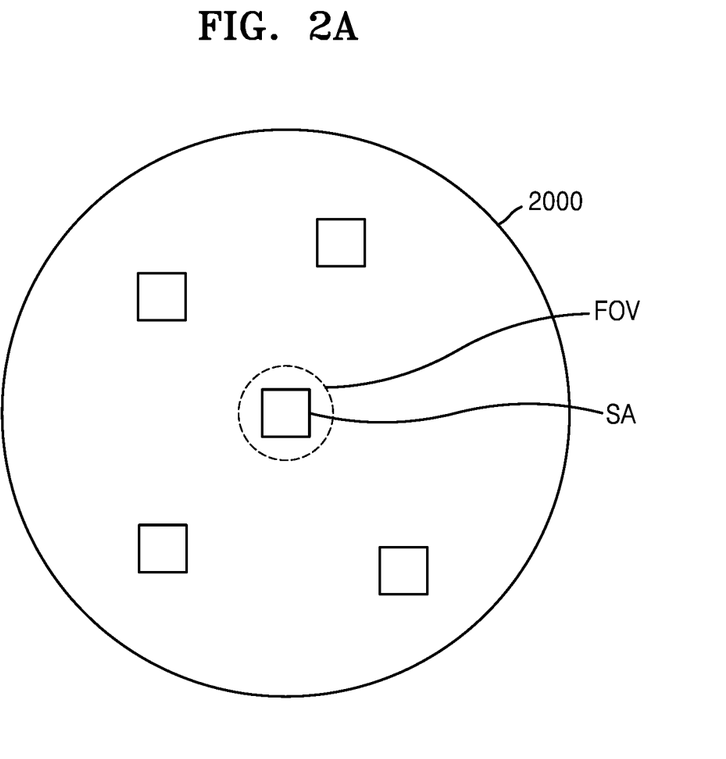
FIG. 2A is a plan view illustrating sample areas on an example inspection object.
Figure 2B:
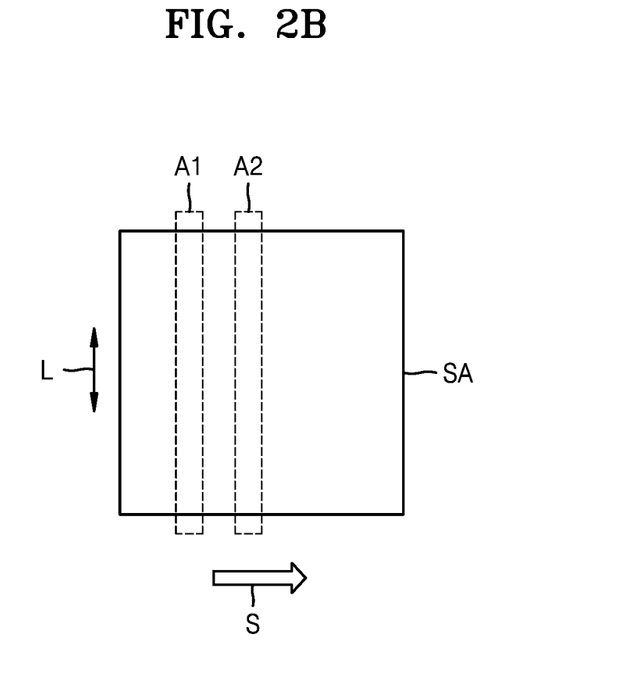
FIG. 2B is an enlarged view of a sample area.

FIG. 2A is a plan view illustrating the sample areas SA on the inspection object 2000, and FIG. 2B is an enlarged view of the sample area SA. Descriptions already given with reference to FIG. 1 are briefly given or omitted.

Referring to FIGS. 2A and 2B, the inspection object 2000 may be, for example, a wafer. However, the inspection object 2000 is not limited thereto. In the inspection object 2000, a plurality of sample areas SA may be selected. The sample area SA may be an area that is selected to represent the state of the inspection object 2000. The larger the number of sample areas SA selected, the more accurately the state of the inspection object 2000 may be checked. However, inspection time may be increased. Thus, an appropriate number of sample areas SA may be selected by considering inspection accuracy and the inspection time.

The sample area SA may be represented by a rectangle, because the HSI for the 2D rectangle including a line direction L and a scan direction S may be performed as illustrated in FIG. 2B. However, the sample area SA may be selected to have a different form, for example, a circle or an ellipse, instead of a rectangle. Here, a dashed line circle may be an area where light is incident on the inspection object 2000 and reflected, and may correspond to, for example, a field of view (FOV), and the FOV may be wider than the sample area SA. For example, the FOV may include the sample area SA.

In FIG. 2B, a first exposure area A1 and a second exposure area A2 indicated as rectangular shapes by dashed lines in the line direction L may denote exposure areas that are imaged on the image sensor 550 through one shot or exposure. For example, the first exposure area A1 may be imaged on the image sensor 550 in a first exposure, and after an exposure area is moved in the scan direction, the second exposure area A2 may be imaged on the image sensor 550 in the second exposure. In FIG. 2B, the first exposure area A1 and the second exposure area A2 are illustrated as being spaced apart from each other. However, this is only for convenience of description, and actually, the exposure areas may be arranged substantially continuously in the scanning direction S.

In the HSI-based inspection apparatus 1000 of the embodiment, a movement in the scan direction S in the sample area SA is performed by a rotation of the Galvano mirror 410 of the scan mirror unit 400. Scanning in the scan direction S may be performed quickly and accurately by the rotation of the Galvano mirror 410, and accordingly, the 2D HSI on the image sensor 550 may be performed promptly and accurately. Performing the 2D HSI on the image sensor 550 through scanning according to the rotation of the Galvano mirror 410 is described in more detail with reference to FIG. 5.

Figure 3A:
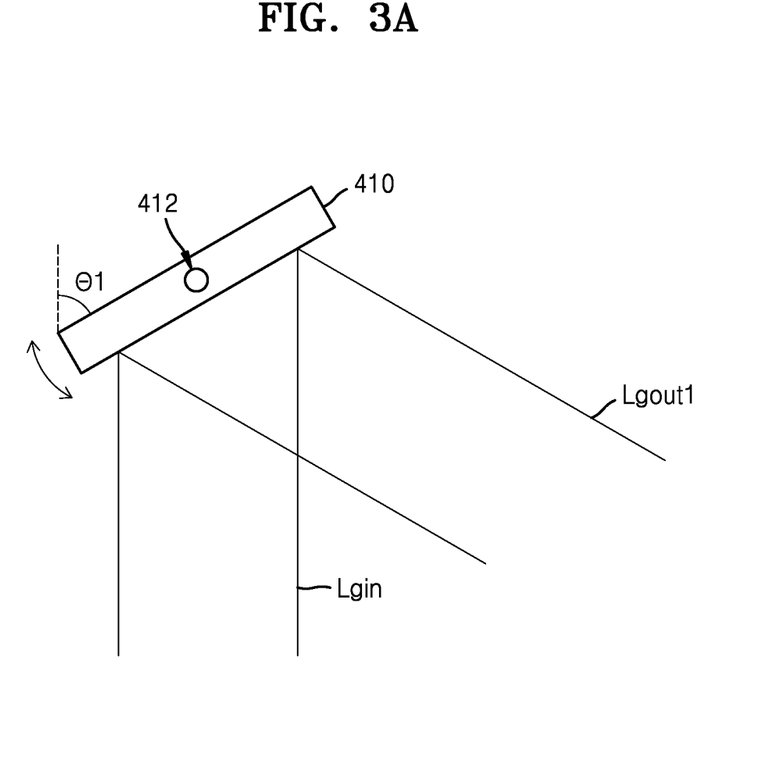
FIGS. 3A and 3B are conceptual diagrams for explaining functions of a Galvano mirror in the example HSI-based inspection apparatus of FIG. 1.
Figure 3B:
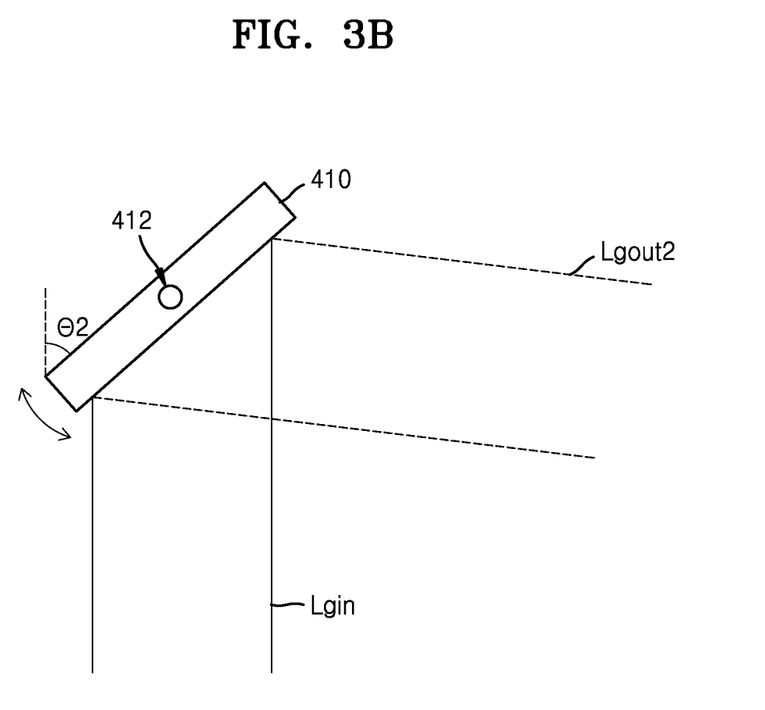
Figure 4A:
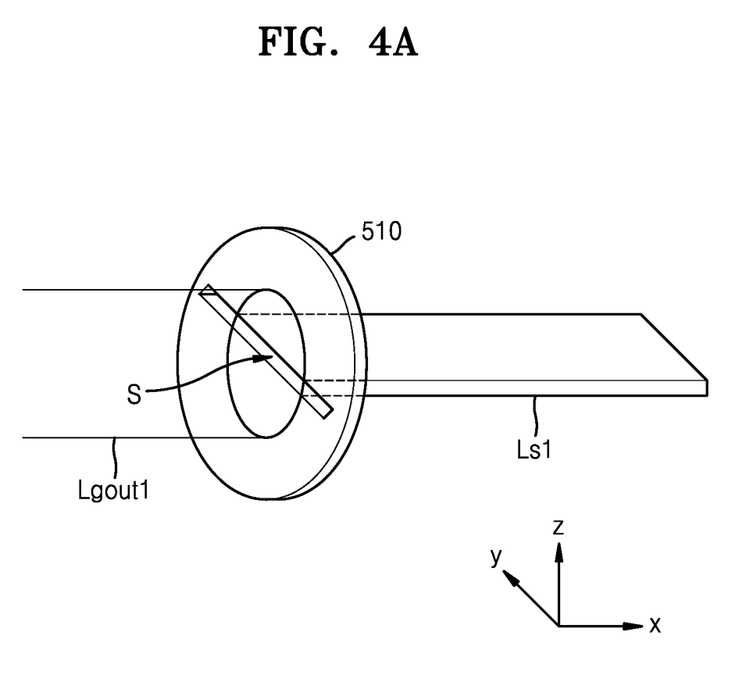
FIGS. 4A and 4B are conceptual diagrams for explaining a function of a slit plate in the example HSI-based inspection apparatus of FIG. 1.
Figure 4B:
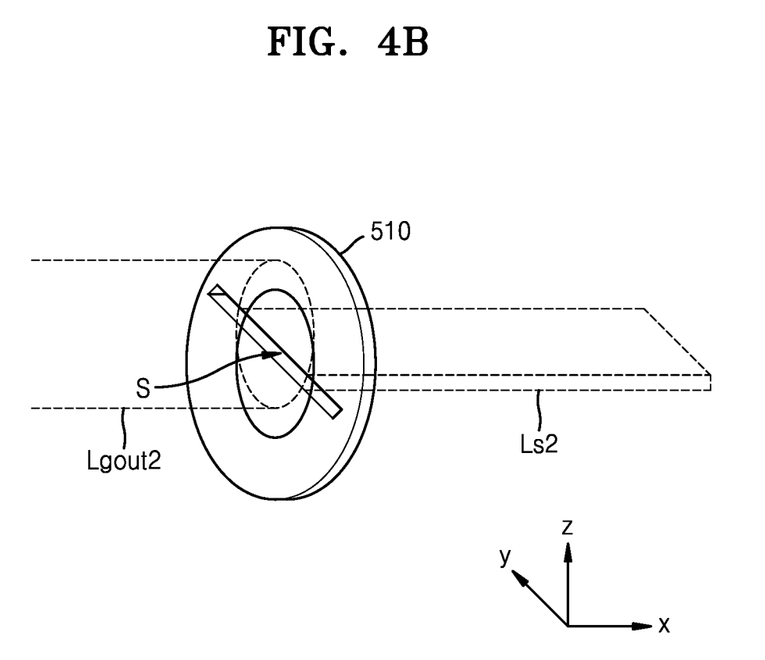

FIGS. 3A and 3B are conceptual diagrams for explaining a function of the Galvano mirror 410 in the HSI-based inspection apparatus 1000 of FIG. 1, and FIGS. 4A and 4B are conceptual diagrams illustrating a function of a slit plate 510 in the HSI-based inspection apparatus 1000 of FIG. 1. Descriptions are given together with reference to FIG. 1, and descriptions already given with reference to FIGS. 1 and 2B are briefly given or omitted.

Referring to FIGS. 3A and 3B, the Galvano mirror 410 may be a scan mirror that performs a scan function. For example, the Galvano mirror 410 may rotate as an angle of the Galvano mirror 410 linearly changes with respect to a change of an input voltage. For example, the Galvano mirror 410 may rotate about a rotational axis 412 in response to the change of an input drive signal.

As illustrated in FIG. 3A, when the Galvano mirror 410 has a first angle θ1 with respect to input light Lgin, the input light Lgin may be reflected by the Galvano mirror 410 and output as first output light Lgout1. In addition, as illustrated in FIG. 3B, when the Galvano mirror 410 rotates about the rotational axis 412 and has a second angle θ2 with respect to the input light Lgin, the input light Lgin may be reflected by the Galvano mirror 410 and output as second output light Lgout2.

Referring to FIGS. 4A and 4B, both the first output light Lgout1 and the second output light Lgout2 output through the Galvano mirror 410 may be directed to the slit plate 510, and may have locations different from each other on the slit plate 510. For example, the second output light Lgout2 may be located at a position higher than the first output light Lgout1 in a third direction (z direction) on the slit plate 510. In FIG. 4B, a solid circle on the slit plate 510 may indicate the first output light Lgout1, and a dashed circle on the slit plate 510 may indicate the second output light Lgout2.

In addition, the first output light Lgout1 and the second output light Lgout2 may be changed into light in a line shape while passing through the slit S of the slit plate 510. For example, the first output light Lgout1 may pass through the slit plate 510 to become first slit light Ls1 in the form of a line, and the second output light Lgout2 may pass through the slit plate 510 to become a second slit light Ls2 in the form of a line. For reference, a first direction (x direction) may be a wavelength direction in which light in the form of a line advances, a second direction (y direction) may be a line direction of light in the form of a line or an extending direction of the slit S, and a third direction (z direction) may correspond to a scanning direction.

Since the input light Lgin initially input to the Galvano mirror 410 does not change, the first output light Lgout1 and the second output light Lgout2 that are output through reflection of the Galvano mirror 410 may be light for the same area of the inspection object 2000. For example, when the input light Lgin is light corresponding to the FOV including the sample area (refer to the sample area SA in FIG. 2) of the inspection object 2000, both the first output light Lgout1 and the second output light Lgout2 may correspond to the same light corresponding to the FOV including the sample area SA. However, the positions of the first output light Lgout1 and the second output light Lgout2 on the slit plate 510 may be different depending on an angle of the Galvano mirror 410 with respect to the input light Lgin. Accordingly, a portion of the first output light Lgout1 and a portion of the second output light Lgout2, each of which passes through the slit S of the slit plate 510, may be different from each other. For example, in the first output light Lgout1, a portion thereof corresponding to the first exposed area A1 may pass through the slit S, while, in the second output light Lgout2, a portion thereof corresponding to the second exposed area A2 may pass through the slit S.

As a result, as an angle of the Galvano mirror 410 with respect to the input light Lgin is changed due to a rotation of the Galvano mirror 410, the scanning may be performed in the scanning direction S with respect to the sample area SA of the inspection object 2000. For example, in the HSI-based inspection apparatus 1000 of example embodiments, the 2D HSI of the sample area SA may be performed promptly and accurately by performing promptly and accurately the scanning in the scan direction S through the rotation of the Galvano mirror 410 of the scan mirror unit 400, without a movement by the stage 600 for the sample area SA of the inspection object 2000. Of course, the movement between the sample areas SA may be performed by a movement by the stage 600.

Figure 5:
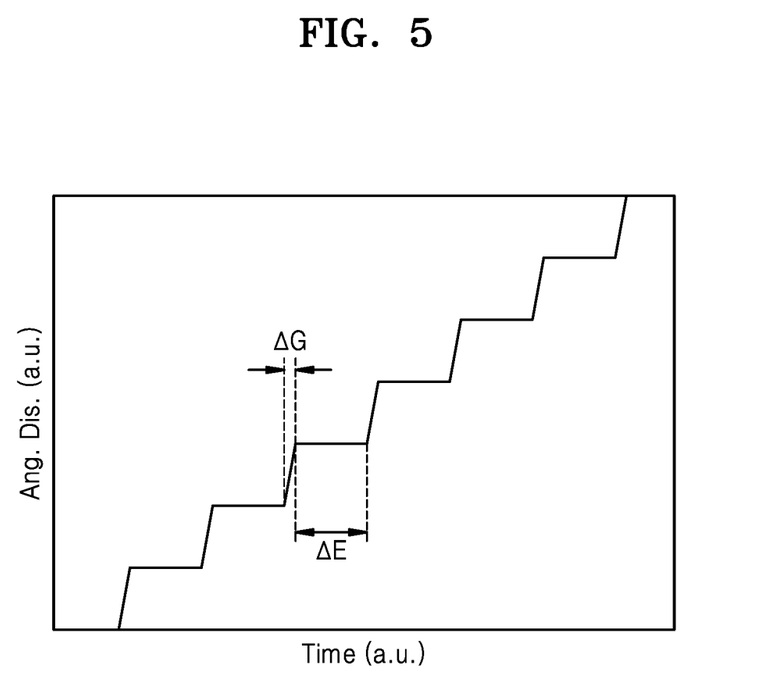
FIG. 5 is a graph illustrating an angular displacement control of the Galvano mirror of a step shape in the example HSI-based inspection apparatus of FIG. 1.

FIG. 5 is a graph illustrating an angular displacement control of a step shape of the Galvano mirror 410 in the HSI-based inspection apparatus 1000 of FIG. 1. The vertical (x) axis may represent time during which the sample area is scanned, the horizontal (y) axis may represent a rotational movement of the Galvano mirror 410, and units may be arbitrary. Descriptions already given with reference to FIGS. 1 through 4B are briefly given or omitted.

Referring to FIG. 5, the 2D HSI for the entire sample area (e.g., the sample area SA in FIG. 2) of the inspection object 2000 may be obtained by performing the HSI by the image sensor 550 while the Galvano mirror 410 is rotated. For example, the HSI may be performed in a manner that the HSI is performed in a state of the Galvano mirror 410 at the first angle θ1 during a first exposure time and is performed in a state of the Galvano mirror 410 at the second angle θ2 during a second exposure time.

As illustrated in the graph, exposure times ΔE for the HSI at respective angles of the Galvano mirror 410 may be substantially identical. In addition, the rotational movement time ΔG of the Galvano mirror 410 may be short. For example, when the exposure time ΔE is several tens of microseconds, the rotational movement time ΔG may be several microseconds. Thus, the rotational movement time ΔG of the Galvano mirror 410 may not significantly affect the performance of the HSI.

In the case of a step-and-repeat type system using the Galvano mirror 410, a time less than about 0.5 s for movement and position setting of the stage 600 may be required, while, in a line scan type system, a time of about one second for movement and acceleration/deceleration of the stage 600 may be required. When it takes about 3 seconds to obtain the image, measurement/inspection times required for each FOV in the case of employing the Galvano mirror 410 and in the case of not employing the Galvano mirror 410 may be different by about 10% or more. In addition, in the case of the line scan type system, since dynamic characteristics of the stage 600 need to be controlled sensitively, a high-performance line scanning stage such as an air-bearing stage may be used. However, by employing the Galvano mirror 410, the HSI-based inspection apparatus 1000 of the example embodiment may employ the stage 600 at a level at which an almost in-position stability is ensured, and accordingly, may contribute to a cost reduction of the entire equipment.

In addition, in the HSI-based inspection apparatus 1000 of the example embodiment, since the Galvano mirror 410 is implemented in a small size, the rotational movement of the Galvano mirror 410 may be controlled to have an angular displacement of the step shape as illustrated in FIG. 5, based on a settling response time at a micro-seconds level. The settling response time may also be referred to as the small angle step response time, and may refer to the amount of time it takes the Galvano mirror 410 to stop moving once the drive signal driving the rotation of the Galvano mirror 410 is removed. Thus, in the HSI-based inspection apparatus 1000 of the embodiment, the hyperspectral camera 500 may quickly and stably obtain the image of the HSI for the entire sample area SA based on the Galvano mirror 410.

The HSI-based inspection apparatus 1000 of the embodiment may be applied not only to the step-and-repeat type system but also to the existing line scan type system. For example, the application of the HSI-based inspection apparatus 1000 of the example embodiment to the line scan type system may be realized by merely maintaining the Galvano mirror 410 at a fixed position and utilizing an existing identical line scan type system.

For reference, an inspection object including a semiconductor structure such as a wafer may be measured/inspected by spectral ellipsometry (SE) equipment. In the case of measurement/inspection by using the SE equipment, an overall tendency of the wafer and a trend between the wafers may be mainly used. This is because since the SE equipment is inspected in a point method, local tendency of the wafer and an overall state corresponding thereto may not be accurately represented. When the SE equipment is used to inspect accurately the overall state of the wafer, it may be required to increase the number of sampling points. However, in this case, the inspection time corresponding thereto may be increased.

On the other hand, the HSI-based inspection apparatus 1000 of the example embodiments of the inventive concept may perform inspection in units of the sample area SA, and in addition, one sample area SA may be relatively quickly and accurately inspected by using the scan mirror unit 400. Thus, by selecting more sample areas and performing inspection of the increased number of sample areas, it may be possible to accurately and quickly perform inspection of the local tendency in the wafer, and accordingly, the inspection of the entire wafer.

In addition, the result of measurement/inspection of the local tendency in the wafer that is obtained by using more spatial sampling and using the HSI-based inspection apparatus 1000 of the example embodiments, may be utilized as a basis for improving process distribution. In the case of a general process treating a relatively wide CD, a module target spec (MTS) may be relatively large, and accordingly, a mean target value (MTV) may, through shifting, converge to the MTS. For example, when an average deposition thickness corresponding to the MTV is too large and deviates from the MTS, the average deposition thickness may be shifted by simply reducing a deposition amount, and accordingly, may be converged to the MTS. However, in recent processes, as a size of the CD is significantly reduced and accordingly, the MTS is also significantly reduced, it may be difficult to converge the MTV into the reduced MTS by merely shifting the MTV. Thus, a process management method has been developed toward improving the process distribution. For improving the process distribution, it may be necessary to measure/inspect a state change on the wafer at a closely spaced interval. Since a spatial resolution of the existing SE exceeds 30 μm, it may be impossible to precisely measure/inspect distribution that is within a range of only several tens of microns. In addition, there may be a limit in increasing the samplings due to characteristics of the point method. On the other hand, the HSI-based inspection apparatus 1000 of the example embodiments of the inventive concept may precisely measure/inspect the wafer by using many samplings at a level of satisfying requirements of the process, and a result thereof may be useful for improving the process distribution.

A method of performing the 2D HSI by using only the scanning through a movement of the stage 600 without the scan mirror unit 400 may be considered. However, in this case, as described above, a considerable amount of time may be required as compared with a case of using the scan mirror unit 400 based on the stage movement, acceleration/deceleration time, etc., and high-performance stage may be required, and accordingly, the cost of entire equipment may be increased.

Figure 6:
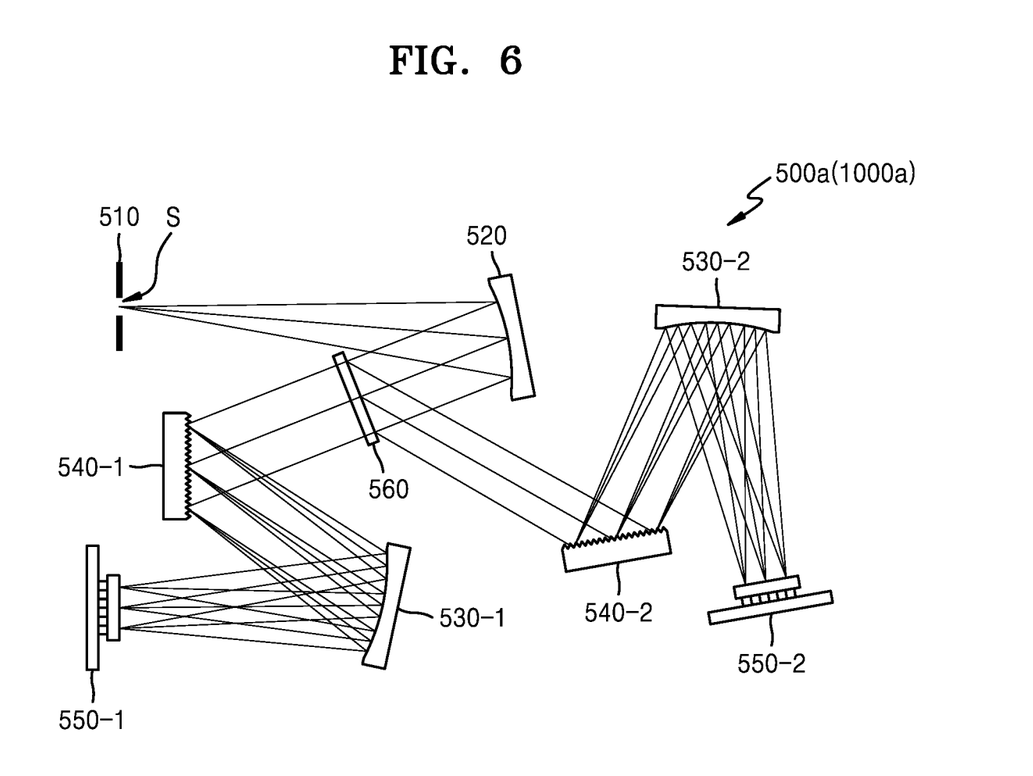
FIG. 6 is a structural diagram of an HSI-based inspection apparatus, according to an example embodiment, and is a detailed structural view illustrating only a hyperspectral camera portion.

FIG. 6 is a structural diagram of an HSI-based inspection apparatus 1000*a* according to an example embodiment, and is a detailed structural view illustrating only a hyperspectral camera 500*a*. Descriptions already given with reference to FIGS. 1 through 5 are briefly given or omitted.

Referring to FIG. 6, the HSI-based inspection apparatus 1000*a* of the embodiment may be different from the HSI-based inspection apparatus 1000 of FIG. 1 in terms of the hyperspectral camera 500a. In the HSI-based inspection apparatus 1000a of the embodiment, the hyperspectral camera 500a may include a slit plate 510, first through third concave mirrors 520, 530-1, and 530-2, a first spectroscopic element 540-1 and a second spectroscopic element 540-2, a first image sensor 550-1 and a second image sensor 550-2, and a dichroic mirror 560.

The slit plate 510 and the first concave mirror 520 may be respectively identical to the slit plate 510 and the first concave mirror 520 of the hyperspectral camera 500 described in the HSI-based inspection apparatus 1000 of FIG. 1. The dichroic mirror 560 may divide the light reflected by the first concave mirror 520 according to each wavelength band and allow the divided light to be incident on the corresponding first and second spectroscopic elements 540-1 and 540-2. The dichroic mirror 560 may transmit or reflect light according to the wavelength band of the incident light. For example, the dichroic mirror 560 may transmit light of some of the wavelength bands of the light reflected by the first concave mirror 520, allow the transmitted light to be incident on the first spectroscopic element 540-1, reflect light of the remaining wavelength bands, and allow the reflected light of the remaining wavelength bands to be incident on the second spectroscopic element 540-2.

The first and second spectroscopic elements 540-1 and 540-2 each may be implemented as a grating or a prism. In the HSI-based inspection apparatus 1000a of the embodiment, the first and second spectroscopic elements 540-1 and 540-2 may be implemented as a grating. Functions of the first and second spectroscopic elements 540-1 and 540-2 may be the same as those described for the spectroscopic element 540 of the hyperspectral camera 500 in the HSI-based inspection apparatus 1000 of FIG. 1.

Light dispersed by the first spectroscopic element 540-1 may be incident on the first image sensor 550-1 via the second concave mirror 530-1, and light dispersed by the second spectroscopic element 540-2 may be incident on the second image sensor 550-2 via the third concave mirror 530-2. The second and third concave mirrors 530-1 and 530-2 may be the same as the second concave mirror 530 described above of the hyperspectral camera 500 in the HSI-based inspection apparatus 1000 of FIG. 1. In addition, the first and second image sensors 550-1 and 550-2 may be the same as the image sensor 550 described above of the hyperspectral camera 500 in the HSI-based inspection apparatus 1000 of FIG. 1.

In the HSI-based inspection apparatus 1000a of the example embodiment, as the hyperspectral camera 500a includes the dichroic mirror 560, and further includes the second spectroscopic element 540-2, the third concave mirror 530-2, and the second image sensor 550-2, light may be divided according to the each wavelength band by using the dichroic mirror 560, and in addition, the spectroscopic image may be obtained by dispersing the light according to each branched light. In this manner, by dividing light with respect to each wavelength band and dispersing the divided light, the spectral efficiency and the transmission rate of the light may be improved, and by selectively applying an image sensor in which the efficiency for each wavelength band is optimized, the HSI of wider wavelength bands may be implemented.

In the HSI-based inspection apparatus 1000a of the embodiment, the hyperspectral camera 500a may include one dichroic mirror 560, but the embodiment is not limited thereto, and may, by including two or more dichroic mirrors, variously dividing the light with respect to each wavelength band. In addition, a spectroscopic element, a concave mirror, and an image sensor may be additionally arranged corresponding to each additional dichroic mirror.

Figure 7:
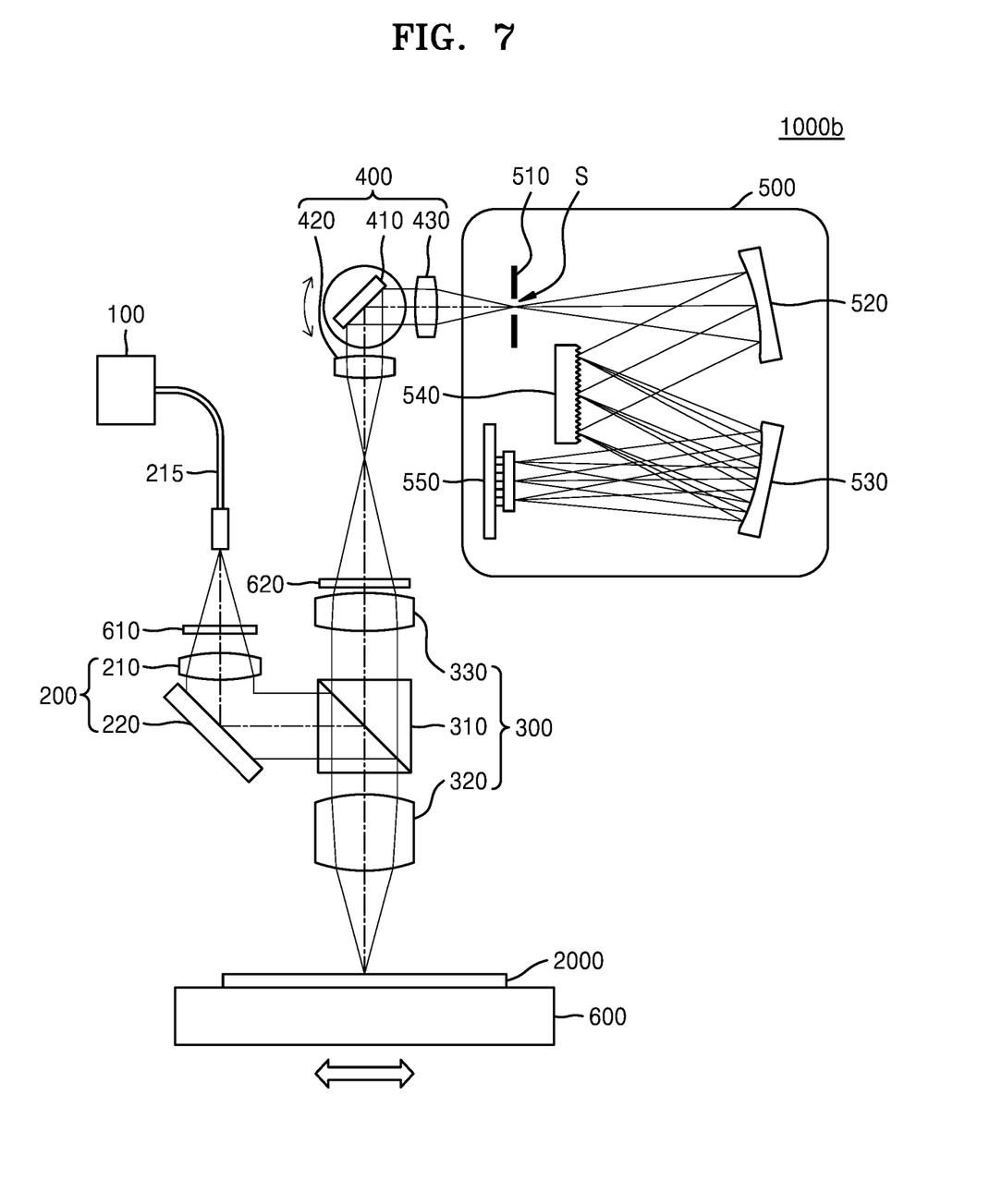
FIG. 7 is a schematic structural diagram illustrating an HSI-based inspection apparatus, according to an example embodiment.

FIG. 7 is a schematic structural view illustrating an HSI-based inspection apparatus 1000b according to an example embodiment. Descriptions already given with reference to FIGS. 1 through 5 are briefly given or omitted.

Referring to FIG. 7, the HSI-based inspection apparatus 1000b of the embodiment may be different from the HSI-based inspection apparatus 1000 of FIG. 1 in that the HSI-based inspection apparatus 1000b further includes a first polarizing plate 610 and a second polarizing plate 620. In the HSI-based inspection apparatus 1000b of the example embodiment, the first polarizing plate 610 may be in the illumination optical system 200, and the second polarizing plate 620 may be in the imaging optical system 300. In FIG. 7, for example, the first polarizing plate 610 may be at a front end of the condensing lens 210 in the illumination optical system 200, and the second polarizing plate 620 may be at a rear end of the tube lens 330 in the imaging optical system 300. Here, the front end and the rear end may refer to relative location with respect to a direction in which light travels. Describing a lens as an example, when light passes through the lens ahead of a corresponding component, it may be interpreted that the lens is at the front end of the corresponding component, and conversely, when the light passes through the lens after having passed the corresponding component, it may be interpreted that the lens is at the rear end of the corresponding component. According to the example embodiment, the location where the first polarizing plate 610 is arranged in the illumination optical system 200 may not be limited to the front end of the condensing lens 210, and may be changed. In addition, the location where the second polarizing plate 620 is arranged in the imaging optical system 300 may not be limited to the rear end of the tube lens 330, and may be changed.

The first and second polarizing plates 610 and 620 may be linear polarizing plates for linearly polarizing incident light. For example, the first and second polarizing plates 610 and 620 may linearly polarize the incident light by passing only a p-polarized light component (or a horizontal component) or only a s-polarized light component (or a vertical component) from the incident light. However, the first and second polarizing plates 610 and 620 may not be limited to the linear polarizing plates.

According to the embodiment, either the first polarizing plate 610 or the second polarizing plate 620 may be omitted. In addition, according to the example embodiment, an additional polarizing plate may be between the first and second polarizing plates 610 and 620. The additional polarizing plate may be, for example, a circular polarizing plate or an elliptically polarizing plate for circularly polarizing light or elliptically polarizing light, respectively.

The HSI-based inspection apparatus 1000b of the embodiment may be utilized in a polarization spectral imaging reflectometry by including the first and second polarizing plates 610 and 620 in the illumination optical system 200 and/or the imaging optical system 300, and accordingly, may accurately measure/inspect a thickness of a thin layer and/or a fine pattern of the thin layer on the inspection object 2000. Although the HSI-based inspection apparatus 1000b of the embodiment includes the hyperspectral camera 500 of the HSI-based inspection apparatus 1000 of FIG. 1, the embodiment is not limited thereto, and the HSI-based inspection apparatus 1000b of the embodiment may include the hyperspectral camera 500a of the HSI-based inspection apparatus 1000a of FIG. 6.

The disclosed embodiments may be used in the manufacturing of semiconductor devices. For example, a plurality of semiconductor devices may be formed on a wafer. The formation of the plurality of semiconductor devices may include one or more processes, such as, for example, etching processes, photolithography processes, CMP processes, etc. The plurality of semiconductor devices may be substantially the same. For example, the plurality of semiconductor devices may be a same type of device, each having insulating layers that are substantially the same in shape, size, and production processes with one another. Then, the plurality of semiconductor devices may be provided to an HSI-based inspection apparatus (e.g., HSI-based inspection apparatus 1000, HSI-based inspection apparatus 1000a, or HSI-based inspection apparatus 1000b), where a subset of the plurality of semiconductor devices may be measured/inspected. The semiconductor devices may be measured/inspected according to the systems and processes discloses herein. Subsequently, when the semiconductor devices measured/inspected are determined to meet the desired criteria (e.g., a thickness of the thin film, a pattern shape, and/or the CD of the thin layer are within desired ranges), additional processing may be performed on the wafer. For example, additional layers may be deposited on the wafer to form semiconductor chips, the semiconductor chips may then be singulated, packaged on a package substrate, and encapsulated by an encapsulant to form a semiconductor device. When semiconductor devices measured/inspected are determined to meet the desired criteria, the semiconductor forming process may be modified, and a plurality of semiconductor devices may be formed on a wafer using the modified semiconductor forming process.

The HSI-based inspection apparatus according to the technical idea of the inventive concept may, by including a scan mirror unit capable of scanning a sample area of an inspection object in one direction, and through a rotation of the scan mirror and a movement of a stage, perform quickly and accurately the 2D HSI for the sample areas of the inspection object in a hyperspectral camera.

In addition, the HSI-based inspection apparatus according to the technical idea of the inventive concept may, by analyzing the 2D HSI for the sample areas of the inspection object, that is, the 3D hyper-cube image for the sample areas of the inspection object, accurately and quickly inspect a state of the inspection object.

While the inventive concept has been particularly shown and described with reference to example embodiments thereof, it will be understood by one of ordinary skill in the art that various changes in shape and details may be made therein without departing from the spirit and scope of the inventive concept as defined by the following claims. Accordingly, the true scope of protection of the inventive concept should be determined by the technical idea of the following claims.

What is claimed is:

1. A hyperspectral imaging (HSI)-based inspection apparatus, the apparatus comprising:
    a stage on which an inspection object is arranged;
    an optical system configured to allow an input light to be incident on the inspection object and to emit reflected light reflected from the inspection object;
    a scan mirror configured to rotate and to reflect light emitted from the optical system while rotating; and
    a hyperspectral camera configured to obtain an image having a wavelength direction and a line direction as two axes for light reflected from the scan mirror,
    wherein, by using rotation of the scan mirror, the hyperspectral camera is configured to perform a two-dimensional (2D) HSI for a sample area of the inspection object,
    wherein the optical system comprises an illumination optical system configured to input the input light from a light source to the inspection object, and an imaging optical system configured to output the reflected light reflected from the inspection object to the scan mirror,
    wherein the illumination optical system comprises a condensing lens and at least one mirror,
    wherein the imaging optical system comprises a tube lens, a splitter, and an objective lens,
    wherein the input light from the illumination optical system is input to the inspection object via the splitter and the objective lens, and
    wherein the reflected light reflected from the inspection object is input to the scan mirror via the objective lens, the splitter, and the tube lens.

2. The apparatus of claim 1,
    wherein the scan mirror is controlled at an angular displacement having a step shape based on a settling response time at a level of micro-seconds, and
    wherein the 2D HSI for a first sample area of the inspection object is performed by the hyperspectral camera through the rotation of the scan mirror.

3. The apparatus of claim 2,
    wherein the sample area is moved to a second sample area of the inspection object by a movement of the stage, and
    wherein the 2D HSI for the second sample area of the inspection object is performed by the hyperspectral camera through the rotation of the scan mirror.

4. The apparatus of claim 1, wherein the scan mirror comprises a Galvano mirror.

5. The apparatus of claim 1,
    wherein the hyperspectral camera comprises a slit plate, a first concave mirror, a second concave mirror, a spectroscopic element, and an image sensor,
    wherein the light reflected from the scan mirror is converted to light of a line shape by the slit plate and is incident on the spectroscopic element through reflection of the first concave mirror, and
    wherein the light incident on the spectroscopic element is dispersed by the spectroscopic element and is input to the image sensor through reflection of the second concave mirror.

6. The apparatus of claim 1,
    wherein the hyperspectral camera comprises a slit plate, first through third concave mirrors, a dichroic mirror, a first spectroscopic element, a second spectroscopic element, a first image sensor, and a second image sensor,
    wherein the light reflected from the scan mirror is converted to light of a line shape by the slit plate and is incident on the dichroic mirror to be divided into two light beams,
    wherein a first beam of the two light beams is dispersed in a first spectral element and is input to the first image sensor via the second concave mirror, and
    wherein a second light beam of the two light beams is dispersed in a second spectral element and is input to the second image sensor via the third concave mirror.

7. The apparatus of claim 6, wherein the dichroic mirror is configured to transmit or reflect incident light incident on the dichroic mirror with respect to each wavelength band, and to separate the incident light into two light beams.

8. The apparatus of claim 1, further comprising:
a first polarizing plate in the illumination optical system, or
a first polarizing plate in the illumination optical system and a second polarizing plate in the imaging optical system.

9. A hyperspectral imaging (HSI)-based inspection apparatus, the apparatus comprising:
a light source;
a stage on which an inspection object is arranged;
an illumination optical system configured to input light from the light source to the inspection object;
an imaging optical system configured to output light reflected from the inspection object to a scan mirror;
the scan mirror configured to rotate and to reflect light output from the imaging optical system while rotating;
a hyperspectral camera configured to obtain an image having a wavelength direction and a line direction as two axes for light reflected from the scan mirror; and
a first polarizing plate in the illumination optical system or a first polarizing plate in the illumination optical system and a second polarizing plate in the imaging optical system,
wherein, by using rotation of the scan mirror, the hyperspectral camera is configured to perform a two-dimensional (2D) HSI for the inspection object.

10. The apparatus of claim 9,
wherein the scan mirror is controlled at an angular displacement having a step shape based on a settling response time at a level of micro-seconds, and
wherein the 2D HSI for at least two sample areas of the inspection object is performed by the hyperspectral camera through the rotation of the scan mirror and a movement of the stage.

11. The apparatus of claim 9, further comprising:
a relay lens arranged at least one portion between the scan mirror and the imaging optical system and between the scan mirror and the hyperspectral camera.

12. The apparatus of claim 9,
wherein the hyperspectral camera comprises a slit plate, a first concave mirror, a second concave mirror, a spectroscopic element, and an image sensor,
wherein light reflected from the scan mirror is converted to light of a line shape by the slit plate and is incident on the spectroscopic element via reflection of the first concave mirror, and
wherein the light incident on the spectroscopic element is dispersed by the spectroscopic element and is input to the image sensor through reflection of the second concave mirror.

13. The apparatus of claim 9,
wherein the hyperspectral camera comprises a slit plate, first through third concave mirrors, a dichroic mirror, a first spectroscopic element, a second spectroscopic element, a first image sensor, and a second image sensor,
wherein light reflected from the scan mirror is converted to light of a line shape by the slit plate and is incident on the dichroic mirror to be divided into two light beams,
wherein a first beam of the two light beams is dispersed in a first spectral element and is input to the first image sensor via the second concave mirror, and
wherein a second light beam of the two light beams is dispersed in a second spectral element and is input to the second image sensor via the third concave mirror.

14. A hyperspectral imaging (HSI)-based inspection apparatus, the apparatus comprising:
an optical system configured to allow input light to be incident on an inspection object and to emit light reflected from the inspection object;
a scan mirror configured to rotate and to reflect light emitted from the optical system while rotating; and
a hyperspectral camera configured to obtain an image having a wavelength direction and a line direction as two axes for light reflected from the scan mirror,
wherein the hyperspectral camera comprises:
a slit plate, a first concave mirror, a second concave mirror, a first spectroscopic element, and a first image sensor, or
the slit plate, the first concave mirror, the second concave mirror, a third concave mirror, a dichroic mirror, the first spectroscopic element, a second spectroscopic element, the first image sensor, and a second image sensor.

15. The apparatus of claim 14,
wherein the optical system comprises an illumination optical system configured to input the input light from a light source to the inspection object and an imaging optical system configured to output the reflected light reflected from the inspection object to the scan mirror, and
wherein a two-dimensional (2D) HSI for the inspection object is performed by rotation of the scan mirror.

16. The apparatus of claim 15, further comprising:
a first polarizing plate in the illumination optical system, or
a first polarizing plate in the illumination optical system and a second polarizing plate in the imaging optical system.

17. The apparatus of claim 14, further comprising:
a light source; and
a stage on which the inspection object is arranged,
wherein the scan mirror is controlled at an angular displacement having a step shape based on a settling response time at a level of micro-seconds, and
wherein a two-dimensional (2D) HSI for at least two sample areas of the inspection object is performed by the hyperspectral camera through the rotation of the scan mirror and a movement of the stage.

* * * * *